Jan. 20, 1942.                E. MARTIN ET AL                    2,270,542
                            ANTIFRICTION BEARING
                          Original Filed July 30, 1938
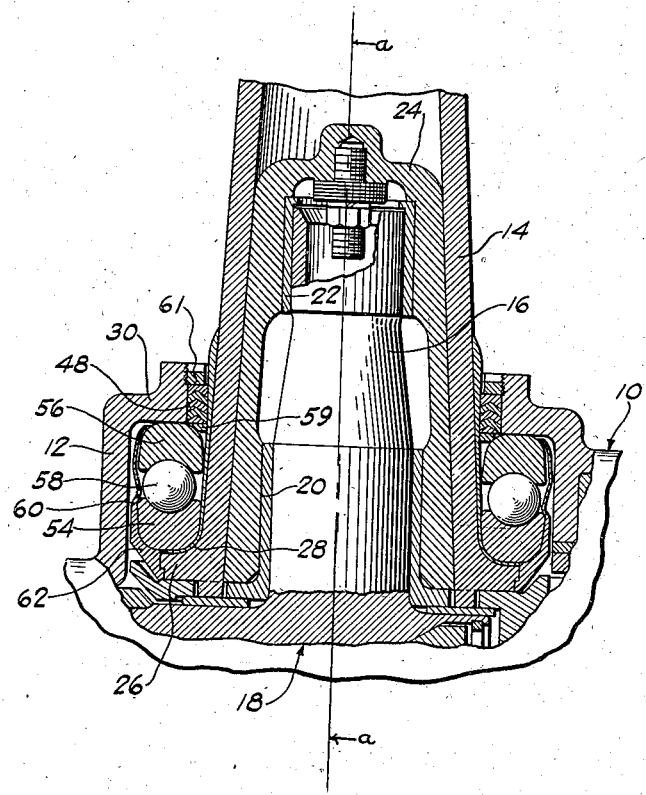
INVENTOR
Erle Martin
John E. Anderson
BY
Harris G. Luther
ATTORNEY Patented Jan. 20, 1942

2,270,542

UNITED STATES PATENT OFFICE 2,270,542

ANTIFRICTION BEARING

Erle Martin, West Hartford, and John E. Anderson, Portland, Conn., assignors to United Aircraft Corporation, East Hartford, Conn., a corporation of Delaware Original application July 30, 1938, Serial No. 222,231. Divided and this application September 18, 1941, Serial No. 411,290

2 Claims. (Cl. 308—196)

This invention relates to improvements in anti-friction bearings and has particular reference to an improved blade shank bearing for a controllable-pitch propeller. This application is a division of United States application Serial No. 222,231, filed July 30, 1938, by Erle Martin and John E. Anderson for Antifriction bearings.

An object of the invention resides in the provision of an improved blade shank bearing so arranged that the blade carried portion thereof may be assembled with the blade after the blade shank has been flanged and otherwise completed.

A further object resides in the provision of improved means for mounting a split bearing race on a propeller blade shank in such a manner that the race will always present a smooth and uniform track or path for the anti-friction elements.

A still further object resides in the provision of an improved blade shank bearing for a controllable-pitch propeller particularly adapted for use with a steel propeller blade.

Other objects and advantages will be more particularly pointed out hereinafter or will become apparent as the description proceeds.

In the accompanying drawing, in which like reference numerals are used to indicate similar parts throughout, there is illustrated a suitable bearing structure constructed according to the invention. The drawing, however, is for the purpose of illustration only and is not to be taken as limiting or restricting the scope of the invention as it will be apparent to those skilled in the art that various changes in the illustrated construction may be resorted to without in any way exceeding the scope of the invention.

In the drawing, the single figure is a vertical sectional view through a propeller blade mounting, showing in section a bearing constructed according to the invention.

Referring to the drawing in detail, the numeral 10 generally indicates the propeller hub barrel which has an annular flange portion 12 which receives the shank of the propeller blade 14 and maintains the blade in operative position upon the arm 16 of the propeller hub spider, generally indicated at 18, in a manner well known to the art. The barrel 10 may be made in two portions separable along a plane including the line $a$—$a$, the two parts being secured together by suitable clamp bolts, not illustrated, although a solid hub having an integral barrel portion and split retaining nut may be used if desired. Suitable bearing bushings 20 and 22 are disposed between the interior of the hollow blade shank and the arm 16 to rotatably support the blade upon the arm and, in the case of a steel propeller blade as illustrated, a suitable adapter 24 may be inserted within the hollow blade shank to provide a proper interior diameter of the blade shank for the bearings 20 and 22, and prevent oil from entering the hollow blade.

At the root or base end, the blade 14 is provided with an outwardly extending radial flange 26 connected with the shank portion by a fillet 28 of relatively large radius and the annular portion 12 of the hub barrel 10 is provided at its outer end with an inwardly directed radial flange 26 on the blade shank. Between the flanges 26 and 30 there is interposed an anti-friction thrust bearing.

This thrust bearing may comprise a pair of split races, as indicated at 54 and 56, separated by a row of anti-friction elements, such as the bearing balls 58. This bearing is assembled upon the propeller blade shank by first assembling the two races 54 and 56 and the balls 58 about the finished blade shank and then locating a ring of malleable metal in position to surround the bearing and the periphery of the blade shank flange. The ring of malleable metal is then swedged or spun down to the shape and position illustrated in the drawing in which it provides the bearing retaining ring 60 which is in loose contact with the race 56 and in close contact with the outer surface of the race 54 and has a lower portion 62 pressed into close contact with the periphery of the blade flange 26. If desired the two portions of the race may be provided with overlapping portions so that the joint plane does not extend directly through the thickness of the race.

A seal between the blade and the hub may be provided by split washer 59 supporting the packing 48 which may be compressed by a split threaded ring 61 into the outer end of the blade socket 12.

While a suitable mechanical embodiment has been hereinabove described and illustrated in the accompanying drawing for the purpose of disclosing the invention, it is to be understood that the invention is not limited to the particular embodiment so described and illustrated, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In combination with a rotatable member having an externally flanged end portion and an internally flanged casing receiving the flanged end of said member for rotational movement relative thereto, an anti-friction thrust bearing between the flange on said member and the flange on said casing comprising, a split race member on the flanged portion of said member, a plurality of movable anti-friction elements on said race member, a second split race member on said anti-friction elements positioned to bear against the flanged portion of said casing and a ring member spun upon said member carried race member and a portion of the member contiguous thereto and overlapping said second race member to maintain said bearing in place upon said member and prevent the parts of said member carried race member from separating.

2. In combination with a rotatable member having an externally flanged end portion and an internally flanged casing receiving the flanged end of said rotatable member for rotational movements relative thereto, an anti-friction thrust bearing between the flange on said member and the flange on said casing comprising, a split race on the flanged portion of said member, a plurality of movable anti-friction elements on said race, a second split race on said anti-friction elements positioned to bear against the flanged portion of said casing, and a ring spun upon said member carried race and a portion of the member contiguous thereto and overlapping said second race to maintain said bearing in place upon said rotatable member and prevent the parts of said member carried race from separating, said ring having a relatively thick portion surrounding said member carried race and a relatively thin and flexible portion surrounding said second race.

ERLE MARTIN.
JOHN E. ANDERSON.